United States Patent
Jin et al.

(10) Patent No.: US 12,285,824 B2
(45) Date of Patent: Apr. 29, 2025

(54) METHODS OF WELDING HIGH MANGANESE STEEL WITH STEP-OUT WELD ZONE EROSION-CORROSION RESISTANCE

(71) Applicant: POSCO Co., Ltd., Gyeongsangbuk-do (KR)

(72) Inventors: HyunWoo Jin, Easton, PA (US); Ning Ma, Whitehouse Station, NJ (US); Adnan Ozekcin, Bethel Park, PA (US); Andrew J. Wasson, Spring, TX (US); Douglas P. Fairchild, Sugar Land, TX (US); IiWook Han, Pohang (KR); Sangchul Lee, Pohang (KR); Bongkeun Lee, Pohang (KR); Jongsub Lee, Seoul (KR)

(73) Assignee: POSCO Co., Ltd., Gyeongsangbuk-do (KR)

( * ) Notice: Subject to any disclaimer, the term of this patent is extended or adjusted under 35 U.S.C. 154(b) by 0 days.

(21) Appl. No.: 18/421,516

(22) Filed: Jan. 24, 2024

(65) Prior Publication Data
US 2024/0157486 A1    May 16, 2024

Related U.S. Application Data (62) Division of application No. 16/672,960, filed on Nov. 4, 2019, now Pat. No. 11,883,906, which is a division
(Continued)

(51) Int. Cl.
B23K 35/02    (2006.01)
B23K 9/18    (2006.01)
(Continued)

(52) U.S. Cl.
CPC .......... B23K 35/3073 (2013.01); B23K 9/186 (2013.01); B23K 9/23 (2013.01);
(Continued)

(58) Field of Classification Search
CPC ............ B23K 35/3073; B23K 35/0261; B23K 35/362; B23K 35/368; B23K 9/186;
(Continued)

(56) References Cited

U.S. PATENT DOCUMENTS 3,924,091 A    12/1975  Suzuki
4,104,504 A *  8/1978  Ridenour ........... B23K 35/3073
                                                  219/146.1
(Continued)

FOREIGN PATENT DOCUMENTS

CA    2930013 A1    6/2015
CA    2930363 A1    6/2015
(Continued)

OTHER PUBLICATIONS

PN183396; Aug. 1978; Application of Carbon Dioxide Gas Shielded Welding on Rolling Stock.
(Continued)

*Primary Examiner* — Humera N. Sheikh
*Assistant Examiner* — Kevin C T Li
(74) *Attorney, Agent, or Firm* — Vorys, Sater, Seymour and Pease LLP (57) ABSTRACT

Methods of welding high manganese steel, the methods comprising: supplying at least one piece of high manganese steel; supplying the metal cored wire comprising a steel sheath with a core comprising powders of certain metal and carbon percentages and at least one of: i: sulfur in an amount less than 0.3 wt. %; or ii. phosphorous in an amount less than 0.03 wt. %; or a combination thereof; and the balance with iron; submerging the at least one piece of high manganese
(Continued)

steel in a slag and arc stabilizer; and applying a current to the metal cored wire to produce a liquid alloy steel composition on the at least one piece of high manganese steel.

8 Claims, 3 Drawing Sheets

Related U.S. Application Data of application No. 15/584,860, filed on May 2, 2017, now Pat. No. 10,493,570.

(60) Provisional application No. 62/330,400, filed on May 2, 2016.

(51) Int. Cl.
| | | |
|---|---|---|
| *B23K 9/23* | (2006.01) | |
| *B23K 35/30* | (2006.01) | |
| *C22C 38/00* | (2006.01) | |
| *C22C 38/02* | (2006.01) | |
| *C22C 38/42* | (2006.01) | |
| *C22C 38/44* | (2006.01) | |
| *C22C 38/58* | (2006.01) | |

(52) U.S. Cl.
CPC ........ *B23K 35/0261* (2013.01); *C22C 38/002* (2013.01); *C22C 38/02* (2013.01); *C22C 38/42* (2013.01); *C22C 38/44* (2013.01); *C22C 38/58* (2013.01)

(58) Field of Classification Search
CPC ......... B23K 9/23; C22C 38/002; C22C 38/02; C22C 38/42; C22C 38/44; C22C 38/58; C22C 38/20; C22C 38/22; C22C 38/24; C22C 38/26; C22C 38/38
See application file for complete search history.

(56) References Cited

U.S. PATENT DOCUMENTS

| | | | |
|---|---|---|---|
| 5,431,753 | A | 7/1995 | Kim et al. |
| 2006/0191606 | A1 | 8/2006 | Ogawa et al. |
| 2007/0051702 | A1 | 3/2007 | James et al. |
| 2013/0174941 | A1 | 7/2013 | Um |
| 2013/0270244 | A1 | 10/2013 | Barhorst et al. |
| 2014/0261918 | A1 | 9/2014 | ExxonMobil |
| 2016/0271739 | A1 | 9/2016 | Lee et al. |

FOREIGN PATENT DOCUMENTS

| | | | | | |
|---|---|---|---|---|---|
| CN | 1439481 | A | | 9/2003 | |
| CN | 1927529 | A | | 3/2007 | |
| CN | 102218622 | A | | 10/2011 | |
| EP | 1762324 | A1 | | 3/2007 | |
| EP | 2153932 | | | 2/2010 | |
| EP | 2153932 | A1 | * | 2/2010 | ......... B23K 35/3605 |
| GB | 1199736 | A | | 7/1970 | |
| JP | S5626694 | A | | 3/1981 | |
| JP | S5659597 | A | | 5/1981 | |
| JP | H481291 | A | | 3/1992 | |
| JP | 104284989 | A | | 10/1992 | |
| JP | H04284989 | A | | 10/1992 | |
| JP | H4339591 | A | | 11/1992 | |
| JP | 2002239722 | A | | 8/2002 | |
| JP | 2003145286 | A | | 5/2003 | |
| JP | 2003220492 | A | | 8/2003 | |
| JP | 2004136329 | A | | 5/2004 | |
| JP | 2006212648 | A | * | 8/2006 | |
| JP | 2013220431 | A | | 10/2013 | |
| KR | 20140007534 | A | | 1/2014 | |
| KR | 20150066192 | A | | 6/2015 | |
| KR | 20150066372 | A | | 6/2015 | |
| KR | 1020150105623 | A | | 9/2015 | |
| WO | 2004110695 | A1 | | 12/2004 | |
| WO | 2015083878 | A1 | | 6/2015 | |
| WO | WO-2015083928 | A1 | * | 6/2015 | ......... B23K 35/0255 |
| WO | 2017192623 | A1 | | 11/2017 | |

OTHER PUBLICATIONS

Japanese office action dated Nov. 4, 2020 and an English summary of same.
Canadian Office Action from corresponding Canadian Application No. 3,022,964 mailed Sep. 15, 2022.
Japanese First Office Action of corresponding JP application No. 2018-557354.
Japanese Second Office Action of corresponding JP application No. 2018-557354.
Chinese First Office Action of corresponding Chinese application No. 201780027234.7 mailed Jul. 29, 2020.
Chinese Third Office Action of corresponding Chinese application No. 201780027234.7 mailed Oct. 26, 2021.
European First Office Action of corresponding EP application No. 17793189.6 mailed Sep. 10, 2020.
European Second Office Action of corresponding EP application No. 17793189.6 mailed Dec. 22, 2021.
European Search Report of corresponding EP application No. 17793189.6 mailed Nov. 14, 2019.

* cited by examiner

METHODS OF WELDING HIGH MANGANESE STEEL WITH STEP-OUT WELD ZONE EROSION-CORROSION RESISTANCE

CROSS REFERENCE TO RELATED APPLICATIONS

This application claims the benefit of and priority to U.S. Provisional Application Ser. No. 62/330,400 filed May 2, 2016 and is a divisional of U.S. application Ser. No. 15/584,860 filed May 2, 2017 (published as US2017/0312861 and patented as U.S. Pat. No. 10,493,570) and is a divisional of Ser. No. 16/672,960 filed Nov. 4, 2019 (published as US2020/0086432); the disclosures of all of which are herein incorporated by reference in its entirety.

BACKGROUND

Field of the Discovery. The present disclosure relates to improved steel compositions and methods of making the same, and more particularly, to high manganese (Mn) steel seam welded pipe having enhanced erosion-corrosion resistance, mechanical strength, and toughness of the seam weld zone and the methods to make the same. In particular, the high manganese steel seam weld zone that contains weld metal and the heat affected zone exhibit step-out erosion resistance, corrosion resistance, hydrogen embrittlement resistance, and stress corrosion cracking resistance in the oil sands slurry environment.

Background Information. In the following specification, the disclosure is described in the context of high manganese steel slurry pipelines used for oil sands production. However, the disclosure is clearly of wider application to any welding of erosion/wear resistant high manganese steel components in which a weldment with adequate strength, toughness, and erosion/wear resistance is desirable, including but not limited to any non-pipe weldments. Various terms are defined in the following specification. For convenience, a Glossary of terms is provided immediately preceding the claims.

Piping systems in mining operations (including oil sands mining industry) are used to transport mixtures of solid rock and sand particles in a liquid or slurry to a processing plant and to recycle debris back to the mining area or to a storage area. Current slurry hydro-transport pipes are typically made from carbon steels (e.g., API 5L $45^{th}$ edition X65 or X70 grade steels). These pipelines undergo severe erosion-corrosion damages during service with the lowest portion/point of the pipeline (6 o'clock positon) experience the most severe erosion-corrosion wear. In order to extend service life of the pipelines, many rotate the pipelines occasionally (e.g., every 3,000 hours of service) by 90°. After three rotations or 12,000 hours of service, the pipelines are replaced. Various materials from martensitic stainless steels (e.g., Duracorr), hard-facing materials (e.g., WC-based, Cr3C2-based), and polymer lining materials (e.g., polyurethane) have been evaluated and used by oil sands mining operators. However, most engineering materials considered so far have found only niche applications due to either relatively poor wear/erosion performance (e.g., polymer liner) or high materials and/or fabrication cost (e.g., WC-based hard metal, Chromium carbide based hard metal overlay) or limited thicknesses of erosion-resistant layer (e.g., bi-metallic multi-layer hardened steel materials).

There also exists a need for enhanced wear resistant steel in the oil sands mining industry. Such oil sands deposits have been commercially recovered since the 1960's, and the recovery rate has grown in recent years. The extraction of bitumen ore has generally been extracted either by surface mining techniques for shallow deposits (e.g., less than 100 m depth), or by in-situ thermal extraction (e.g., involving the injection of steam, chemical solvents and/or mixtures thereof) for deep deposits located deeper underground (e.g., around 100 m or deeper). For the surface mining of shallow oil sands, many types of heavy equipment and pipelines are utilized. First, the oil sands are typically excavated using shovels which transfer the mined material to trucks/vehicles. The vehicles move the oil sand ores to ore preparation facilities, where the mined ore is typically crushed and mixed with hot water. The oil sands slurries are then typically pumped through hydro-transport pipelines to the primary separation cell (PSC), where the oil bitumen is generally separated from the sand and water. After the bitumen is separated, the remaining sand and water slurry is then transported through tailings pipelines to tailings ponds for sands to settle down.

For example, the Canadian oil sands resources in northeastern Alberta contain large oil sands deposits covered by shallow overburden, thereby making surface mining an efficient method of oil bitumen extraction. In general, the sands are often mined with shovels and transported to the processing plants by hydro-transport pipelines or the like, where granular material oil sand is typically transported as aqueous slurry. After bitumen extraction, tailings are then typically transported by pipeline from the processing facilities to sites where separation of solids and water occurs. The hydro-transport of large amounts of slurry mixture causes significant metal loss in conventional metallic pipelines or the like, which results in short replacement cycles and considerable operational costs.

Thus, the oil sands mining and ore preparation processes involve several stress and/or impact abrasion challenges in multiple equipment/operational areas (e.g., shovel teeth, hoppers, crushers, conveyers, vibrating screens, slurry pumps, pipelines, etc.). For example, in the downstream slurry transportation and extraction processes, some of the challenges encountered in the equipment, pipelines (e.g., hydro-transport pipelines and tailings pipelines), pumps and/or the PSC include erosion, erosion/corrosion, corrosion, stress, wear and/or abrasion or the like of the equipment/materials. These equipment/material erosion/corrosion challenges or the like lead to significant repair, replacement and/or maintenance costs, as well as to production losses.

As noted, current piping structures for slurry hydro-transport and tailings pipelines are typically made from low carbon, pipeline grade steel (e.g., API specification 5 L $45^{th}$ edition X65, X70 grade). In general, fast moving solids in the slurry flow can cause considerable metal loss from the pipes (e.g., metal loss of the inner pipe wall). The aqueous and aerated slurry flow also typically causes accelerated pipe erosion by creating a corrosive environment. Moreover, particulate matter in the slurry (under the influence of gravity) causes damage along, inter alia, the bottom inside half of the pipes. For example, the hydro-transport and tailings pipelines that carry the sand and water slurry in oil sands mining operations undergo severe erosion-corrosion damage during service, while the bottom portion/point of the pipeline (e.g., at the 6 o'clock position) typically experiences the most severe erosion wear.

In order to extend service life of the pipelines, as discussed above, some mine operators have utilized the practice of periodically rotating pipelines. Various materials have been evaluated and used by oil sands mining operators, as discussed above. However, such materials have found only niche applications, typically due to either relatively poor wear/erosion performance (e.g., polymer liner), high material/fabrication costs (e.g., WC-based hard metal, chromium-carbide based hard metal overlay material), or limited available thicknesses (e.g., bimetallic multi-layer hardened steel materials). However, pipe erosion and the like remains a serious problem, and alternative pipe structures and/or materials are sought to allow for a more efficient/economical operation/solution.

Improved steel compositions having enhanced erosion/wear/corrosion performance have been developed recently to reduce operational costs in mining operations. Specifically, improved high Mn steel with enhanced wear/erosion/corrosion resistance has been developed for oil sands mining applications, including slurry pipes (2013EM118-PA). In order to be successfully implemented, high Mn steel slurry pipe sections must be joined together in the field to create high Mn steel slurry pipelines. A need exists for welding technology that can be used to construct high Mn steel slurry pipelines for oil sands mining projects. Slurry pipelines are constructed using several different types of joining methods, including: girth butt welds, flanges, and mechanical couplings.

High Mn steel weld metals developed to date are not sufficient for joining erosion resistant high Mn steel slurry pipelines. Conventional high Mn steel consumables used to weld cast Hadfield steel (commonly used in railway components) do not provide sufficient weld metal strength to be used to join the recently developed erosion resistant high Mn steel slurry pipes. High Mn steel welding consumables used for hardfacing applications cannot consistently provide the required weld metal toughness levels for slurry pipeline girth welds.

U.S. Patent Application Publication No. 2013/0174941 describes high Mn steel developed for cryogenic applications such as storage containers for liquefied natural gas (LNG). Weld metals have been developed for cryogenic high Mn steel, such as those described in J. K. Choi, et al, "High Manganese Austenitic Steel for Cryogenic Applications", Proceedings of the $22^{'d}$ International ISOPE Conference, Rhodes, Greece 2012. These cryogenic high Mn steel weld metals, while providing sufficient toughness at very low temperatures down to −200° C., do not provide adequate weld metal strength for the erosion resistant high Mn steel slurry pipe application.

U.S. Patent Application Publication No. 2014/0261918 describes high manganese steel compositions with enhanced erosion-corrosion resistance to reduce operational costs in oil sands mining operations, including slurry pipes. For slurry pipeline applications, high manganese steel plates must be produced and welded into pipe. Such high manganese steel pipes, both weld metal and base steel, are exposed to the internal slurry environment, which is highly erosive-corrosive. Therefore, step-out erosion-corrosion performance of the seam weld is required in order to fully utilize the benefit of the high manganese steel base pipe.

Thus, a need exists for improved high manganese steel seam weld zone and heat affected zone which exhibits step-out erosion resistance, corrosion resistance, hydrogen embrittlement resistance, and stress corrosion cracking resistance that can be applied during high manganese steel line pipe production without undue concern regarding weldability or ease of use. These and other inefficiencies and opportunities for improvement are addressed and/or overcome by the compositions, articles, and methods of the present disclosure.

SUMMARY

A novel weld metal and methods of making and using the same are provided that achieves adequate strength, adequate toughness, and high erosion/corrosion resistance to produce erosion resistant high manganese steel slurry pipe through seam welding. Embodiments of the present disclosure include weld metal chemistries, welding processes, and control of welding practices that produce suitable weld microstructures and mechanical properties for the application, thereby providing superior strength of the joints and therefore, the entire welded structure.

In one aspect, the weld metal provided by the disclosure comprises between about 0.3 weight % to about 1.2 weight % carbon, between about 0.1 weight % to about 3.0 weight % silicon, between about 9.0 weight % to about 30 weight % manganese, at least one of less than or equal to about 0.3 weight % of sulfur and less than or equal to about 0.03 weight % of phosphorous, and the balance is iron. The welding metal can further comprise less than or equal to about 8 weight % of chromium, less than or equal to about 6 weight % of nickel, less than or equal to about 6 weight % molybdenum, less than or equal to about 5 weight % tungsten, less than or equal to about 4 weight % copper, less than or equal to about 2 weight % niobium, less than or equal to about 2 weight % vanadium, less than or equal to about 2 weight % titanium, less than or equal to about 0.4 weight % nitrogen, and less than or equal to about 1 weight % boron.

Another aspect of the present disclosure provides a novel metal cored wire for submerged arc welding. The wire comprising: a steel sheath with a core comprising powders of alloying elements as described above with regard to the composition of the weld metal.

An additional aspect of the present disclosure relates to a method of welding high manganese steel. The method for applying the weld metal uses submerged arc welding. The weld metal chemistry, and welding parameters (e.g, heat input) are controlled to ensure reduced susceptibility to solidification cracking and prevent significant degradation of weld metal and heat affected zone (HAZ) toughness, and strength. In an embodiment, the method comprises: supplying at least one piece of high manganese steel; supplying a metal cored wire; submerging the at least one piece of high manganese steel in a slag and arc stabilizer; and applying a current to the metal cored wire to produce a liquid alloy steel composition on the at least one piece of high manganese steel. The metal cored wire can comprise: between about 0.3 weight % to about 1.2 weight % carbon, between about 0.1 weight % to about 3.0 weight % silicon, between about 9.0 weight % to about 30 weight % manganese, at least one of less than or equal to about 0.3 weight % of sulfur and less than or equal to about 0.03 weight % of phosphorous, and the balance is iron.

Any combination or permutation of embodiments is envisioned. Additional advantageous steps, features, functions and applications of the disclosed systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Exemplary embodiments of the present disclosure are further described with reference to the appended figures. It is to be noted that the various steps, features and combinations of steps/features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein.

DETAILED DESCRIPTION

The exemplary embodiments disclosed herein are illustrative of advantageous steel compositions, and systems of the present disclosure and methods/techniques thereof. It should be understood, however, that the disclosed embodiments are merely exemplary of the present disclosure, which may be embodied in various forms. Therefore, details disclosed herein with reference to exemplary steel compositions/fabrication methods and associated processes/techniques of assembly and use are not to be interpreted as limiting, but merely as the basis for teaching one skilled in the art how to make and use the advantageous steel compositions of the present disclosure. Drawing figures are not necessarily to scale and in certain views, parts may have been exaggerated for purposes of clarity.

Presently described are compositions, articles, and methods that related to the surprising and unexpected discovery that the compositions as described herein provide high manganese seam welded pipe with excellent erosion-corrosion resistance, mechanical strength, and toughness of the seam weld zone. In particular, the seam weld zone which contains the weld metal and the heat affected zone exhibits step-out erosion resistance, corrosion resistance, hydrogen embrittlement, and stress corrosion cracking resistance in, for example, oil sands slurry environments.

According to an aspect of the present disclosure a weld metal is provided. All percentages herein relating to the composition of the weld metal are expressed in weight %, unless otherwise specifically stated. The weld metal comprises: between about 0.3 weight % to about 1.2 weight % carbon; between about 0.1 weight % to about 3.0 weight % silicon; between about 9.0 weight % to about 30 weight % manganese; at least one of: about 0.3 weight % of sulfur and about 0.03 weight % of phosphorous; and the balance is iron. The weld metal of the present disclosure may be referred to as erosion resistant, high manganese steel or ER-HMS. While the balance of the weld metal composition is iron, it is possible the weld metal may include other unlisted components, for example, impurities or the like.

The welding metal can further comprise about 8 weight % of chromium, about 6 weight % of nickel, about 6 weight % molybdenum, about 5 weight % tungsten, about 4 weight % copper, about 2 weight % niobium, about 2 weight % vanadium, about 2 weight % titanium, about 0.4 weight % nitrogen, and about 1 weight % boron.

All numerical values within the detailed description and the claims herein are modified by "about" or "approximately" the indicated value, and take into account experimental error and variations that would be expected by a person having ordinary skill in the art.

Where a range of values is provided, it is understood that each intervening value, to the tenth of the unit of the lower limit unless the context clearly dictates otherwise, between the upper and lower limit of that range and any other stated or intervening value in that stated range is encompassed within the present disclosure. Ranges from any lower limit to any upper limit are contemplated. The upper and lower limits of these smaller ranges which may independently be included in the smaller ranges is also encompassed within the present disclosure, subject to any specifically excluded limit in the stated range. Where the stated range includes one or both of the limits, ranges excluding either or both of those included limits are also included in the present disclosure.

Although methods and materials similar or equivalent to those described herein can also be used in the practice or testing of the present disclosure, the preferred methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural references unless the context clearly dictates otherwise.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and "consisting essentially of shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Unless otherwise defined, all technical and scientific terms used herein have the same meaning as commonly understood by one of ordinary skill in the art to which this present disclosure belongs. The terminology used in the description of the present disclosure herein is for describing particular embodiments only and is not intended to be limiting of the present disclosure.

Definitions

CRA: Corrosion resistant alloys, can mean, but is in no way limited to, a material specially formulated to have good corrosion resistance for fabricating equipment to be used in a corrosive environment. Corrosion-resistant alloys may be formulated for a wide range of harsh and corrosive conditions.

Ductility: can mean, but is in no way limited to, a measure of a material's ability to undergo appreciable plastic deformation before fracture; it may be expressed as percent elongation (% EL) or percent area reduction (% AR).

Corrosion Resistance: can mean, but is in no way limited to, a material's inherent resistance to deterioration caused by exposure to a reactive or corrosive environment.

Toughness: can mean, but is in no way limited to, resistance to crack initiation and propagation.

Stress Corrosion Cracking (SCC): can mean, but is in no way limited to, the cracking of materials due to simultaneous action of stress and a reactive and corrosive environment.

Sulfide Stress Cracking (SSC): can mean, but is in no way limited to, cracking of materials due to exposure to fluids containing hydrogen sulfide (e.g., H2S).

Yield Strength: can mean, but is in no way limited to, the ability of a material to bear load without deformation.

Cooling rate: can mean, but is in no way limited to, the rate of cooling of a piece of material, which in general is measured at the center, or substantially at the center, of a piece of material.

Austenite: can mean, but is in no way limited to, a metallurgical phase in steels that has a face-centered cubic (FCC) atomic crystalline structure.

Martensite: can mean, but is in no way limited to, a metallurgical phase in steels that can be, but not limited to, formed by diffusionless phase transformation in which the parent (typically austenite) and product phases have a specific orientation relationship.

ε(epsilon)-martensite: can mean, but is in no way limited to, a specific form of martensite having hexagonal close packed atomic crystalline structure which forms upon cooling or straining of austenite phase. E-martensite typically forms on close packed (111) planes of austenite phase and is similar to deformation twins or stacking fault clusters in morphology.

α'(alpha prime)-martensite: can mean, but is in no way limited to, a specific form of martensite having body-centered cubic (BCC) or body-centered tetragonal (BCT) atomic crystalline structure which forms upon cooling or straining of austenite phase; a'-martensite typically forms as platelets.

Carbide: can mean, but is in no way limited to, a compound of iron/metal and carbon.

Weldment: can mean, but is in no way limited to, a unit formed by welding together an assembly of pieces.

Weld Metal: can mean, but is in no way limited to, the part of weldment or welded joint that has been fused in its formation.

Heat-Affected Zone (HAZ): can mean, but is in no way limited to, the portion of the base metal that was not melted during the welding, but whose microstructure and mechanical properties were altered by the heat for welding.

Preferential Weld Corrosion (PWC): can mean, but is in no way limited to, a selective corrosion of metal associated with a weld such that the weld metal and/or the adjacent heat affected zone (HAZ) corrode rather than the parent base metal.

Weld Metallurgy/Microstructure/Mechanical Properties

The novel erosion resistant high Mn steels (ER-HMS) weldment of the present disclosure can provide the required strength, toughness, and high erosion-corrosion resistance to join erosion resistant HMS pipe through seam welding. The microstructures required to meet these property requirements are achieved through proper control of weld metal chemistry and welding process parameters.

Conventional high manganese steel consumables (e.g., Hadfield steel weld overlay wires commonly used in railroad components) do not provide suitable weld metal strength or corrosion-resistance in recently developed erosion resistant high manganese steel slurry pipes. The high manganese steel weld metals described in the present disclosure provide a superior step-out erosion/corrosion performance in slurry pipe applications.

Figure 4:
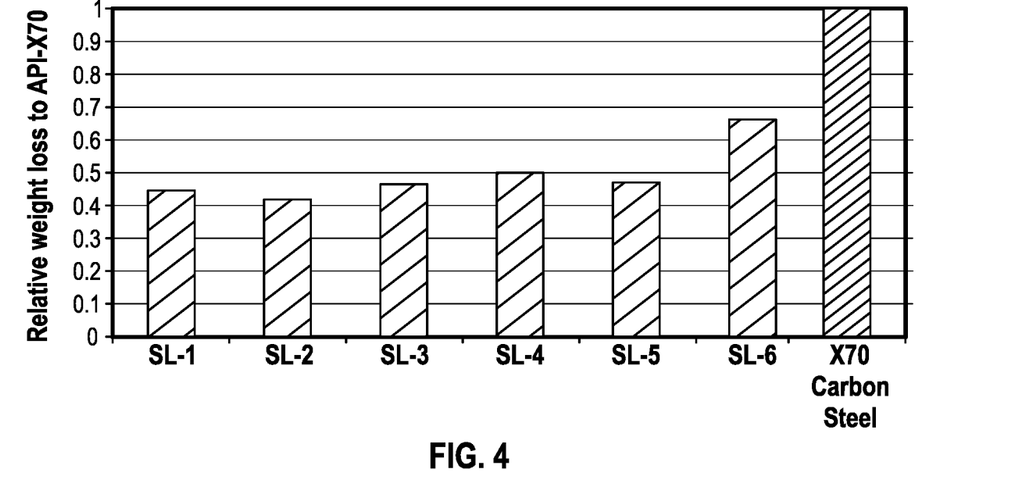
FIG. 4 abrasive wear resistance of weld metal by ASTM G65 rotating rubber wheel test.

The ER-HMS weld metal must achieve the minimum tensile strength properties required for the application (e.g., slurry pipe). For example, the weld metal yield strength can be greater than the yield strength of the erosion resistant HMS base pipe or greater than the specified minimum yield strength (SMYS) required by the slurry pipeline design. The weld metal ultimate tensile strength can also be greater than the specified minimum ultimate tensile strength (SMUTS) for the base pipe body. Additionally, the weld metal may provide some minimum specified level of tensile elongation. The ER-HMS weld metal can achieve each of these requirements because it is designed to contain a highly metastable austenite phase, which transforms into hard martensite phase and undergoes twinning upon straining. Additionally, the solid solution strengthening elements in the weld metal (e.g., molybdenum) provide additional strengthening by disrupting lattice dislocation motion. The combination of these strengthening mechanisms provides a high strength and work hardening rate that achieves the tensile strength requirements for seam welds of typical slurry pipelines. As an example, tested ER-HMS weld metal properties are shown in FIG. 4 and compared to seam weld requirements for API X70 grade based pipeline design (SMYS is 70 ksi). The API X70 grade design is common for oil sands slurry pipeline design. Modifications to ER-HMS weld metal chemistry can be made within the ranges disclosed here to achieve the required weld metal tensile properties for a range of potential slurry pipeline grades, including X52, X60, X65, X70, and X80.

The high manganese steel weld metals described in the present disclosure are required to have similar mechanical properties and erosion/corrosion properties to the base metal high manganese steel used for the slurry pipe application, as the microstructures and stress distributions in these regions greatly affect the strength of the joints and hence the entire weld structure. As such, in an embodiment, the ER-HMS weld metal of the present disclosure has similar microstructure and similar strain-induced transformation behavior as the base metal high manganese steel that is used, for example, slurry pipe application.

In an embodiment, the weld metal comprises: between about 0.3 weight % and about 1.2 weight % carbon; between about 0.1 weight % and about 3.0 weight % silicon; between about 9.0 weight % and about 30 weight % manganese; at least one of ≤about 0.3 weight % of sulfur and ≤about 0.03 weight % of phosphorous; ≤about 8 weight % of chromium; ≤about 6 weight % of nickel; ≤about 6 weight % molybdenum; ≤about 5 weight % tungsten; ≤about 4 weight % copper; ≤about 2 weight % niobium; ≤about 2 weight % vanadium; ≤about 2 weight % titanium; ≤about 0.4 weight % nitrogen; ≤about 1 weight % boron, and the balance of the composition is iron. In a particular embodiment, the carbon is in a range of about 0.45 to about 0.7 weight %, the silicon is in a range of about 0.2 to about 1.5 weight %, and/or the manganese is in a range of about 12 to about 20 weight %. In another embodiment, the chromium is in a range of about 2 to about 6 weight %, the nickel is in an amount about 5 weight %, molybdenum is in a range of about 0.5 to about 3 weight %, tungsten is in a range of about 0.1 to about 2 weight %, copper is an amount ≤about 2 weight %, niobium is an amount ≤about 1 weight %, vanadium is an amount ≤about 1 weight %, titanium is an amount ≤about 1 weight %, nitrogen is in a range of about 0.01 to about 0.3 weight %, and/or boron is in a range of about 0.01 to about 0.4 weight %.

The high manganese steel weld metals, and HAZ described in the present disclosure are required to have similar mechanical properties and erosion/corrosion properties to the base metal high manganese steel that are joined, for example, for slurry pipe application. As such, in an embodiment, the ER-HMS weld metal, and HAZ of the present disclosure has similar microstructure and similar strain-induced transformation behavior as the base metal high manganese steel. Unlike conventional carbon steels, the microstructure of high manganese steel consists of metastable austenite phase with a face centered cubic (fcc) structure at room temperature.

Upon straining, the metastable austenite phase can undergo a number of different phase transformations through strain-induced transformation. These transformations include: austenite phase transforms into microtwins (fcc) structure in which twin is aligned with matrix, ε-martensite (hexagonal lattice), and α'-martensite (body centered tetragonal lattice), depending on specific steel chemistry and/or temperature. These transformation products are key in producing the unique properties of high manganese steels. For example, fine microtwins effectively segment primary austenite grains and act as strong obstacles for dislocation motion. This effectively refines the grains and results in an excellent combination of high ultimate tensile strength and ductility.

The chemistry of base metal erosion resistant high manganese steel has been specifically tailored to produce transformation products that provide good erosion and wear performance. The base metal is produced to contain a highly metastable austenite phase, which often transforms into hard α'-martensite upon straining. Upon surface wear of these steels, the surface layer of the highly metastable austenite phase can transform to α'-martensite. This friction-induced phase transformation leads to formation of a thin, hard surface layer consisting of martensite over an interior of tough, untransformed metastable austenite. This is a desirable combination for wear/erosion applications.

In order to produce the required mechanical behavior in ER-HMS weld metal, the microstructure should be similar to that of the base metal erosion resistant HMS. In an embodiment, manganese levels are similar in both the weld metal and the base metal. Manganese is the primary element in high manganese steels, and it is important in stabilizing the austenitic structure during cooling and deformation. Furthermore, manganese deoxidizes, like silicon, and strengthens the weld metal by solid-solution strengthening. Additionally, manganese increases work hardening exponent when in a suitable range. For example, it was determined that manganese of about 9 weight % or greater is required to stabilize predominantly austenite phase within weld metal. It was further determined that greater than about 30 weight % of manganese results in a decrease in weld metal toughness within weld metal. As such, manganese can be about 9 weight % to about 30 weight % of the total weld metal or the core of the metal cored wire of the present disclosure. In a particular embodiment, manganese is present in about 12 weight % to about 20 weight % of the total weld metal or the core of the metal cored wire. In some embodiment, the weld metal or core of the metal cored wire comprises manganese in a range of about 9 weight % to about 28 weight %, about 9 weight % to about 26 weight %, about 9 weight % to about 24 weight %, about 9 weight % to about 22 weight %, about 9 weight % to about 20 weight %, about 9 weight % to about 18 weight %, about 9 weight % to about 16 weight %, about 9 weight % to about 14 weight %, about 9 weight % to about 12 weight %, about 10 weight % to about 30 weight %, about 10 weight % to about 28 weight %, about 10 weight % to about 26 weight %, about 10 weight % to about 24 weight %, about 10 weight % to about 22 weight %, about 10 weight % to about 20 weight %, about 10 weight % to about 18 weight %, about 10 weight % to about 16 weight %, about 10 weight % to about 14 weight %, about 10 weight % to about 12 weight %, about 12 weight % to about 30 weight %, about 12 weight % to about 28 weight %, about 12 weight % to about 26 weight %, about 12 weight % to about 24 weight %, about 12 weight % to about 22 weight %, about 12 weight % to about 20 weight %, about 12 weight % to about 18 weight %, about 12 weight % to about 16 weight %, about 12 weight % to about 14 weight %, about 14 weight % to about 30 weight %, about 14 weight % to about 28 weight %, about 14 weight % to about 26 weight %, about 14 weight % to about 24 weight %, about 14 weight % to about 22 weight %, about 14 weight % to about 20 weight %, about 14 weight % to about 18 weight %, about 14 weight % to about 16 weight %, about 16 weight % to about 30 weight %, about 1 weight % to about 28 weight %, about 16 weight % to about 26 weight %, about 16 weight % to about 24 weight %, about 16 weight % to about 22 weight %, about 16 weight % to about 20 weight %, about 16 weight % to about 18 weight %, about 18 weight % to about 30 weight %, about 18 weight % to about 28 weight %, about 18 weight % to about 26 weight %, about 18 weight % to about 24 weight %, about 18 weight % to about 22 weight %, about 18 weight % to about 20 weight %, about 20 weight % to about 30 weight %, about 20 weight % to about 28 weight %, about 20 weight % to about 26 weight %, about 20 weight % to about 24 weight %, about 20 weight % to about 22 weight %, about 22 weight % to about 30 weight %, about 22 weight % to about 28 weight %, about 22 weight % to about 26 weight %, about 22 weight % to about 24 weight %, about 24 weight % to about 30 weight %, about 24 weight % to about 28 weight %, about 24 weight % to about 26 weight %, about 26 weight % to about 30 weight %, about 26 weight % to about 28 weight %, or about 28 weight % to about 30 weight %. In particular embodiments, the weld metal or core of the metal cored wire comprises manganese about 9 weight %, about 10 weight %, about 11 weight %, about 12 weight %, about 13 weight %, about 14 weight %, about 15 weight %, about 16 weight %, about 17 weight %, about 18 weight %, about 19 weight %, about 20 weight %, about 21 weight %, about 22 weight %, about 23 weight %, about 24 weight %, about 25 weight %, about 26 weight %, about 27 weight %, about 28 weight %, about 29 weight %, or about 30 weight %.

Carbon is an effective austenite stabilizer and has high solubility in the austenite phase. Therefore, carbon alloying can be used to stabilize the austenite phase during cooling the molten alloy. Carbon also strengthens the matrix by solid solution hardening and affects the arc stability and the toughness of the weld metal when added in appropriate quantities. The weld material of the present disclosure can comprise about 0.3 weight % to about 1.2 weight % of the total weld metal or the core of the metal cored wire. It was determined that when carbon in the metal cored wire is less than 0.3 weight %, the weld metal does not have adequate strength and erosion resistance, and when carbon is in excess of 1.2 weight %, toughness drops and the weld metal/seam has a higher propensity to hot cracking. In a particular embodiment, carbon is in a range of about 0.45 weight % to about 0.7 weight %. In some embodiment, the weld metal or core of the metal cored wire comprises carbon in a range of about 0.3 weight % to about 1.0 weight %, about 0.3 weight % to about 0.8 weight %, about 0.3 weight % to about 0.6 weight %, about 0.4 weight % to about 1.2 weight %, about 0.4 weight % to about 1.0 weight %, about 0.4 weight % to about 0.8 weight %, about 0.4 weight % to about 0.6 weight %, about 0.6 weight % to about 1.2 weight %, about 0.6 weight % to about 1.0 weight %, about 0.6 weight % to about 0.8 weight %, about 0.8 weight % to about 1.2 weight %, about 0.8 weight % to about 1.0 weight %, or about 1.0 weight % to about 1.2 weight %. In certain embodiments, the weld metal or core of the metal cored wire comprises carbon in about 0.3 weight %, about 0.4 weight %, about 0.5 weight %, about 0.6 weight %, about 0.7 weight %, about 0.8 weight %, about 0.9 weight %, about 1.0 weight %, about 1.1 weight %, or about 1.2 weight %.

Silicon additions provide some solid solution strengthening in addition to sustaining the a'-martensite transformation, while promoting c-martensite formation upon deformation at ambient temperature. Silicon is also a ferrite stabilizer and deoxidizer. Silicon can be present in about 0.1 weight % to about 3 weight % of the weld metal or the core of the metal cored wire. It was determined that when the content of silicon is less than 0.1 weight %, the weld metal does not have an adequate strength. In addition, the deficiency of SiO2 formed as a product of weld metal deoxidation causes an imbalance of slag viscosity and impairs welding performance. Furthermore, when silicon content is greater than 3 weight %, toughness drops. In a particular embodiment, silicon is in a range of about 0.2 weight % to about 1.5 weight %. In some embodiment, the weld metal or core of the metal cored wire comprises silicon in a range of about 0.1 weight % to about 2.8 weight %, about 0.1 weight % to about 2.6 weight %, about 0.1 weight % to about 2.4 weight %, about 0.1 weight % to about 2.2 weight %, about 0.1 weight % to about 2.0 weight %, about 0.1 weight % to about 1.8 weight %, about 0.1 weight % to about 1.6 weight %, about 0.1 weight % to about 1.4 weight %, about 0.1 weight % to about 1.2 weight %, about 0.1 weight % to about 1.0 weight %, about 0.1 weight % to about 0.8 weight %, about 0.1 weight % to about 0.6 weight %, about 0.1 weight % to about 0.4 weight %, about 0.3 weight % to about 3.0 weight %, about 0.3 weight % to about 2.8 weight %, about 0.3 weight % to about 2.6 weight %, about 0.3 weight % to about 2.4 weight %, about 0.3 weight % to about 2.2 weight %, about 0.3 weight % to about 2.0 weight %, about 0.3 weight % to about 1.8 weight %, about 0.3 weight % to about 1.6 weight %, about 0.3 weight % to about 1.4 weight %, about 0.3 weight % to about 1.2 weight %, about 0.3 weight % to about 1.0 weight %, about 0.3 weight % to about 0.8 weight %, about 0.3 weight % to about 0.6 weight %, about 0.5 weight % to about 3.0 weight %, about 0.5 weight % to about 2.8 weight %, about 0.5 weight % to about 2.6 weight %, about 0.5 weight % to about 2.4 weight %, about 0.5 weight % to about 2.2 weight %, about 0.5 weight % to about 2.0 weight %, about 0.5 weight % to about 1.8 weight %, about 0.5 weight % to about 1.6 weight %, about 0.5 weight % to about 1.4 weight %, about 0.5 weight % to about 1.2 weight %, about 0.5 weight % to about 1.0 weight %, about 0.5 weight % to about 0.8 weight %, about 0.7 weight % to about 3.0 weight %, about 0.7 weight % to about 2.8 weight %, about 0.7 weight % to about 2.6 weight %, about 0.7 weight % to about 2.4 weight %, about 0.7 weight % to about 2.2 weight %, about 0.7 weight % to about 2.0 weight %, about 0.7 weight % to about 1.8 weight %, about 0.7 weight % to about 1.6 weight %, about 0.7 weight % to about 1.4 weight %, about 0.7 weight % to about 1.2 weight %, about 0.7 weight % to about 1.0 weight %, about 0.9 weight % to about 3.0 weight %, about 0.9 weight % to about 2.8 weight %, about 0.9 weight % to about 2.6 weight %, about 0.9 weight % to about 2.4 weight %, about 0.9 weight % to about 2.2 weight %, about 0.9 weight % to about 2.0 weight %, about 0.9 weight % to about 1.8 weight %, about 0.9 weight % to about 1.6 weight %, about 0.9 weight % to about 1.4 weight %, about 0.9 weight % to about 1.2 weight %, about 1.0 weight % to about 3.0 weight %, about 1.0 weight % to about 2.8 weight %, about 1.0 weight % to about 2.6 weight %, about 1.0 weight % to about 2.4 weight %, about 1.0 weight % to about 2.2 weight %, about 1.0 weight % to about 2.0 weight %, about 1.0 weight % to about 1.8 weight %, about 1.0 weight % to about 1.6 weight %, about 1.0 weight % to about 1.4 weight %, about 1.0 weight % to about 1.2 weight %, about 1.2 weight % to about 3.0 weight %, about 1.2 weight % to about 2.8 weight %, about 1.2 weight % to about 2.6 weight %, about 1.2 weight % to about 2.4 weight %, about 1.2 weight % to about 2.2 weight %, about 1.2 weight % to about 2.0 weight %, about 1.2 weight % to about 1.8 weight %, about 1.2 weight % to about 1.6 weight %, about 1.2 weight % to about 1.4 weight %, about 1.4 weight % to about 3.0 weight %, about 1.4 weight % to about 2.8 weight %, about 1.4 weight % to about 2.6 weight %, about 1.4 weight % to about 2.4 weight %, about 1.4 weight % to about 2.2 weight %, about 1.4 weight % to about 2.0 weight %, about 1.4 weight % to about 1.8 weight %, about 1.4 weight % to about 1.6 weight %, about 1.6 weight % to about 3.0 weight %, about 1.6 weight % to about 2.8 weight %, about 1.6 weight % to about 2.6 weight %, about 1.6 weight % to about 2.4 weight %, about 1.6 weight % to about 2.2 weight %, about 1.6 weight % to about 2.0 weight %, about 1.6 weight % to about 1.8 weight %, about 1.8 weight % to about 3.0 weight %, about 1.8 weight % to about 2.8 weight %, about 1.8 weight % to about 2.6 weight %, about 1.8 weight % to about 2.4 weight %, about 1.8 weight % to about 2.2 weight %, about 1.8 weight % to about 2.0 weight %, about 2.0 weight % to about 3.0 weight %, about 2.0 weight % to about 2.8 weight %, about 2.0 weight % to about 2.6 weight %, about 2.0 weight % to about 2.4 weight %, about 2.0 weight % to about 2.2 weight %, about 2.2 weight % to about 3.0 weight %, about 2.2 weight % to about 2.8 weight %, about 2.2 weight % to about 2.6 weight %, about 2.2 weight % to about 2.4 weight %, about 2.4 weight % to about 3.0 weight %, about 2.4 weight % to about 2.8 weight %, about 2.6 weight % to about 2.8 weight %, or about 2.8 weight % to about 3.0 weight %. In certain embodiments, the weld metal or core of the metal cored wire comprises carbon in about 0.1 weight %, about 0.2 weight %, about 0.3 weight %, about 0.4 weight %, about 0.5 weight %, about 0.6 weight %, about 0.7 weight %, about 0.8 weight %, about 0.9 weight %, about 1.0 weight %, about 1.1 weight %, about 1.2 weight %, about 1.3 weight %, about 1.4 weight %, about 1.5 weight %, about 1.6 weight %, about 1.7 weight %, about 1.8 weight %, about 1.9 weight %, about 2.0 weight %, about 2.1 weight %, about 2.2 weight %, about 2.3 weight %, about 2.4 weight %, about 2.5 weight %, about 2.6 weight %, about 2.7 weight %, about 2.8 weight %, about 2.9 weight %, or about 3.0 weight %.

In certain embodiments, the weld metal or core of the metal cored wire may further comprise chromium, nickel, molybdenum, tungsten, copper, niobium, vanadium, titanium, tantalum, nitrogen, and/or boron. The amounts described in greater detail below further enhance the strength, erosion-corrosion resistance, and toughness of the weld metal.

Chromium is a ferrite stabilizer, which enhances the formation of ferrite phase during cooling and increase corrosion resistance when added to high manganese steel weld metal. Chromium is a strong carbide former and promotes the precipitation of carbides, such as M2C and M23C6, depending on the alloy level and/or thermal treatment temperature. Furthermore, chromium addition is typically important for corrosion resistance enhancement. The addition of chromium to the iron-manganese alloy system reduces the thermal expansion coefficient. Excessive chromium addition, however, may lead to coarse grain boundary carbide formation and a drop in toughness. Chromium can be present in amount less than or equal to about 8.0 weight % of the weld metal or the core of the metal cored wire. In a particular embodiment, chromium is about 2.0 weight % to about 6.0 weight % of the weld metal or the core of the metal cored wire. In a particular embodiment, chromium is in a range of about 2.0 weight % to about 6.0 weight %. In some embodiment, the weld metal or core of the metal cored wire comprises chromium in a range of about 0.0 weight % to about 8.0 weight %, about 0.0 weight % to about 7.5 weight %, about 0.0 weight % to about 7.0 weight %, about 0.0 weight % to about 6.5 weight %, about 0.0 weight % to about 6.0 weight %, about 0.0 weight % to about 5.5 weight %, about 0.0 weight % to about 5.0 weight %, about 0.0 weight % to about 4.5 weight %, about 0.0 weight % to about 4.0 weight %, about 0.0 weight % to about 3.5 weight %, about 0.0 weight % to about 3.0 weight %, about 0.0 weight % to about 2.5 weight %, about 0.0 weight % to about 2.0 weight %, about 0.0 weight % to about 1.5 weight %, about 0.0 weight % to about 1.0 weight %, about 0.5 weight % to about 8.0 weight %, about 0.5 weight % to about 7.5 weight %, about 0.5 weight % to about 7.0 weight %, about 0.5 weight % to about 6.5 weight %, about 0.5 weight % to about 6.0 weight %, about 0.5 weight % to about 5.5 weight %, about 0.5 weight % to about 5.0 weight %, about 0.5 weight % to about 4.5 weight %, about 0.5 weight % to about 4.0 weight %, about 0.5 weight % to about 3.5 weight %, about 0.5 weight % to about 3.0 weight %, about 0.5 weight % to about 2.5 weight %, about 0.5 weight % to about 2.0 weight %, about 0.5 weight % to about 1.5 weight %, about 0.5 weight % to about 1.0 weight %, about 1.0 weight % to about 8.0 weight %, about 1.0 weight % to about 7.5 weight %, about 1.0 weight % to about 7.0 weight %, about 1.0 weight % to about 6.5 weight %, about 1.0 weight % to about 6.0 weight %, about 1.0 weight % to about 5.5 weight %, about 1.0 weight % to about 5.0 weight %, about 1.0 weight % to about 4.5 weight %, about 1.0 weight % to about 4.0 weight %, about 1.0 weight % to about 3.5 weight %, about 1.0 weight % to about 3.0 weight %, about 1.0 weight % to about 2.5 weight %, about 1.0 weight % to about 2.0 weight %, about 1.0 weight % to about 1.5 weight %, about 1.5 weight % to about 8.0 weight %, about 1.5 weight % to about 7.5 weight %, about 1.5 weight % to about 7.0 weight %, about 1.5 weight % to about 6.5 weight %, about 1.5 weight % to about 6.0 weight %, about 1.5 weight % to about 5.5 weight %, about 1.5 weight % to about 5.0 weight %, about 1.5 weight % to about 4.5 weight %, about 1.5 weight % to about 4.0 weight %, about 1.5 weight % to about 3.5 weight %, about 1.5 weight % to about 3.0 weight %, about 1.5 weight % to about 2.5 weight %, about 1.5 weight % to about 2.0 weight %, about 2.0 weight % to about 8.0 weight %, about 2.0 weight % to about 7.5 weight %, about 2.0 weight % to about 7.0 weight %, about 2.0 weight % to about 6.5 weight %, about 2.0 weight % to about 6.0 weight %, about 2.0 weight % to about 5.5 weight %, about 2.0 weight % to about 5.0 weight %, about 2.0 weight % to about 4.5 weight %, about 2.0 weight % to about 4.0 weight %, about 2.0 weight % to about 3.5 weight %, about 2.0 weight % to about 3.0 weight %, about 2.0 weight % to about 2.5 weight %, about 2.5 weight % to about 8.0 weight %, about 2.5 weight % to about 7.5 weight %, about 2.5 weight % to about 7.0 weight %, about 2.5 weight % to about 6.5 weight %, about 2.5 weight % to about 6.0 weight %, about 2.5 weight % to about 5.5 weight %, about 2.5 weight % to about 5.0 weight %, about 2.5 weight % to about 4.5 weight %, about 2.5 weight % to about 4.0 weight %, about 2.5 weight % to about 3.5 weight %, about 2.5 weight % to about 3.0 weight %, about 3.0 weight % to about 8.0 weight %, about 3.0 weight % to about 7.5 weight %, about 3.0 weight % to about 7.0 weight %, about 3.0 weight % to about 6.5 weight %, about 3.0 weight % to about 6.0 weight %, about 3.0 weight % to about 5.5 weight %, about 3.0 weight % to about 5.0 weight %, about 3.0 weight % to about 4.5 weight %, about 3.0 weight % to about 4.0 weight %, about 3.0 weight % to about 3.5 weight %, about 3.5 weight % to about 8.0 weight %, about 3.5 weight % to about 7.5 weight %, about 3.5 weight % to about 7.0 weight %, about 3.5 weight % to about 6.5 weight %, about 3.5 weight % to about 6.0 weight %, about 3.5 weight % to about 5.5 weight %, about 3.5 weight % to about 5.0 weight %, about 3.5 weight % to about 4.5 weight %, about 3.5 weight % to about 4.0 weight %, about 4.0 weight % to about 8.0 weight %, about 4.0 weight % to about 7.5 weight %, about 4.0 weight % to about 7.0 weight %, about 4.0 weight % to about 6.5 weight %, about 4.0 weight % to about 6.0 weight %, about 4.0 weight % to about 5.5 weight %, about 4.0 weight % to about 5.0 weight %, about 4.0 weight % to about 4.5 weight %, about 4.5 weight % to about 8.0 weight %, about 4.5 weight % to about 7.5 weight %, about 4.5 weight % to about 7.0 weight %, about 4.5 weight % to about 6.5 weight %, about 4.5 weight % to about 6.0 weight %, about 4.5 weight % to about 5.5 weight %, about 4.5 weight % to about 5.0 weight %, about 5.0 weight % to about 8.0 weight %, about 5.0 weight % to about 7.5 weight %, about 5.0 weight % to about 7.0 weight %, about 5.0 weight % to about 6.5 weight %, about 5.0 weight % to about 6.0 weight %, about 5.0 weight % to about 5.5 weight %, about 5.5 weight % to about 8.0 weight %, about 5.5 weight % to about 7.5 weight %, about 5.5 weight % to about 7.0 weight %, about 5.5 weight % to about 6.5 weight %, about 5.5 weight % to about 6.0 weight %, about 6.0 weight % to about 8.0 weight %, about 6.0 weight % to about 7.5 weight %, about 6.0 weight % to about 7.0 weight %, about 6.0 weight % to about 6.5 weight %, about 6.5 weight % to about 8.0 weight %, about 6.5 weight % to about 7.5 weight %, about 6.5 weight % to about 7.0 weight %, about 7.0 weight % to about 8.0 weight %, about 7.0 weight % to about 7.5 weight %, or about 7.5 weight % to about 8.0 weight %. In certain embodiments, the weld metal or core of the metal cored wire comprises carbon in about 0.25 weight %, about 0.5 weight %, about 0.75 weight %, about 1.0 weight %, about 1.25 weight %, about 1.5 weight %, about 1.75 weight %, about 2.0 weight %, about 2.25 weight %, about 2.5 weight %, about 2.75 weight %, about 3.0 weight %, about 3.25 weight %, about 3.5 weight %, about 3.75 weight %, about 4.0 weight %, about 4.5 weight %, about 4.25 weight %, about 4.75 weight %, about 5.0 weight %, about 5.25 weight %, about 5.5 weight %, about 5.75 weight %, about 6.0 weight %, about 6.25 weight %, about 6.5 weight %, about 6.75 weight %, about 7.0 weight %, about 7.25 weight %, about 7.5 weight %, about 7.75 weight %, or about 8.0 weight %.

Nickel additions can provide additional austenite stability and can improve weld metal toughness by solid-solution strengthening. Nickel also significantly increases the corrosion resistance and low-temperature toughness of weld metal. Nickel can be present in up to 6 weight % of the weld metal or the core of the metal cored wire. In another embodiment, nickel is present in up to 5 weight %. In a certain embodiments, nickel is about 0.2 weight % to about 6 weight % or about 0.2 weight % to about 5 weight %. Nickel additions at higher levels can result in a decrease in strength. In a particular embodiment, nickel is in a range of about 0.0 weight % to about 5.0 weight %. In some embodiment, the weld metal or core of the metal cored wire comprises nickel in a range of about 0.0 weight % to about 6.0 weight %, about 0.0 weight % to about 5.5 weight %, about 0.0 weight % to about 5.0 weight %, about 0.0 weight % to about 4.5 weight %, about 0.0 weight % to about 4.0 weight %, about 0.0 weight % to about 3.5 weight %, about 0.0 weight % to about 3.0 weight %, about 0.0 weight % to about 2.5 weight %, about 0.0 weight % to about 2.0 weight %, about 0.0 weight % to about 1.5 weight %, about 0.0 weight % to about 1.0 weight %, about 0.5 weight % to about 6.0 weight %, about 0.5 weight % to about 5.5 weight %, about 0.5 weight % to about 5.0 weight %, about 0.5 weight % to about 4.5 weight %, about 0.5 weight % to about 4.0 weight %, about 0.5 weight % to about 3.5 weight %, about 0.5 weight % to about 3.0 weight %, about 0.5 weight % to about 2.5 weight %, about 0.5 weight % to about 2.0 weight %, about 0.5 weight % to about 1.5 weight %, about 0.5 weight % to about 1.0 weight %, about 1.0 weight % to about 6.0 weight %, about 1.0 weight % to about 5.5 weight %, about 1.0 weight % to about 5.0 weight %, about 1.0 weight % to about 4.5 weight %, about 1.0 weight % to about 4.0 weight %, about 1.0 weight % to about 3.5 weight %, about 1.0 weight % to about 3.0 weight %, about 1.0 weight % to about 2.5 weight %, about 1.0 weight % to about 2.0 weight %, about 1.0 weight % to about 1.5 weight %, about 1.5 weight % to about 6.0 weight %, about 1.5 weight % to about 5.5 weight %, about 1.5 weight % to about 5.0 weight %, about 1.5 weight % to about 4.5 weight %, about 1.5 weight % to about 4.0 weight %, about 1.5 weight % to about 3.5 weight %, about 1.5 weight % to about 3.0 weight %, about 1.5 weight % to about 2.5 weight %, about 1.5 weight % to about 2.0 weight %, about 2.0 weight % to about 6.0 weight %, about 2.0 weight % to about 5.5 weight %, about 2.0 weight % to about 5.0 weight %, about 2.0 weight % to about 4.5 weight %, about 2.0 weight % to about 4.0 weight %, about 2.0 weight % to about 3.5 weight %, about 2.0 weight % to about 3.0 weight %, about 2.0 weight % to about 2.5 weight %, about 2.5 weight % to about 6.0 weight %, about 2.5 weight % to about 5.5 weight %, about 2.5 weight % to about 5.0 weight %, about 2.5 weight % to about 4.5 weight %, about 2.5 weight % to about 4.0 weight %, about 2.5 weight % to about 3.5 weight %, about 2.5 weight % to about 3.0 weight %, about 3.0 weight % to about 6.0 weight %, about 3.0 weight % to about 5.5 weight %, about 3.0 weight % to about 5.0 weight %, about 3.0 weight % to about 4.5 weight %, about 3.0 weight % to about 4.0 weight %, about 3.0 weight % to about 3.5 weight %, about 3.5 weight % to about 6.0 weight %, about 3.5 weight % to about 5.5 weight %, about 3.5 weight % to about 5.0 weight %, about 3.5 weight % to about 4.5 weight %, about 3.5 weight % to about 4.0 weight %, about 4.0 weight % to about 4.0 weight %, about 4.0 weight % to about 6.0 weight %, about 4.0 weight % to about 5.5 weight %, about 4.0 weight % to about 5.0 weight %, about 4.0 weight % to about 4.5 weight %, about 4.5 weight % to about 6.0 weight %, about 4.5 weight % to about 5.5 weight %, about 4.5 weight % to about 5.0 weight %, about 5.0 weight % to about 6.0 weight %, about 5.0 weight % to about 5.5 weight %, or about 5.5 weight % to about 6.0 weight %. In certain embodiments, the weld metal or core of the metal cored wire comprises nickel in about 0.25 weight %, about 0.5 weight %, about 0.75 weight %, about 1.0 weight %, about 1.25 weight %, about 1.5 weight %, about 1.75 weight %, about 2.0 weight %, about 2.25 weight %, about 2.5 weight %, about 2.75 weight %, about 3.0 weight %, about 3.25 weight %, about 3.5 weight %, about 3.75 weight %, about 4.0 weight %, about 4.5 weight %, about 4.25 weight %, about 4.75 weight %, about 5.0 weight %, about 5.25 weight %, about 5.5 weight %, about 5.75 weight %, or about 6.0 weight %.

Molybdenum (Mo) and tungsten (W) are ferrite stabilizers and stable carbide formers. Molybdenum and tungsten can provide significant solid solution strengthening and refines the solidification cell structure by solute drag. Molybdenum can be present in up to 6 weight % of the weld metal or the core of the metal cored wire. In a particular embodiment, molybdenum is about 0.5 weight % to about 3.0 weight %. In another embodiment, Molybdenum is present in up to 5 weight %. In a certain embodiments, molybdenum is about 0.2 weight % to about 6 weight % or about 0.2 weight % to about 5 weight %. Molybdenum additions at higher levels can result in a decrease in strength. In a particular embodiment, molybdenum is in a range of about 0.0 weight % to about 5.0 weight %. In some embodiment, the weld metal or core of the metal cored wire comprises molybdenum in a range of about 0.0 weight % to about 5.5 weight %, about 0.0 weight % to about 5.0 weight %, about 0.0 weight % to about 4.5 weight %, about 0.0 weight % to about 4.0 weight %, about 0.0 weight % to about 3.5 weight %, about 0.0 weight % to about 3.0 weight %, about 0.0 weight % to about 2.5 weight %, about 0.0 weight % to about 2.0 weight %, about 0.0 weight % to about 1.5 weight %, about 0.0 weight % to about 1.0 weight %, about 0.5 weight % to about 6.0 weight %, about 0.5 weight % to about 5.5 weight %, about 0.5 weight % to about 5.0 weight %, about 0.5 weight % to about 4.5 weight %, about 0.5 weight % to about 4.0 weight %, about 0.5 weight % to about 3.5 weight %, about 0.5 weight % to about 3.0 weight %, about 0.5 weight % to about 2.5 weight %, about 0.5 weight % to about 2.0 weight %, about 0.5 weight % to about 1.5 weight %, about 0.5 weight % to about 1.0 weight %, about 1.0 weight % to about 6.0 weight %, about 1.0 weight % to about 5.5 weight %, about 1.0 weight % to about 5.0 weight %, about 1.0 weight % to about 4.5 weight %, about 1.0 weight % to about 4.0 weight %, about 1.0 weight % to about 3.5 weight %, about 1.0 weight % to about 3.0 weight %, about 1.0 weight % to about 2.5 weight %, about 1.0 weight % to about 2.0 weight %, about 1.0 weight % to about 1.5 weight %, about 1.5 weight % to about 6.0 weight %, about 1.5 weight % to about 5.5 weight %, about 1.5 weight % to about 5.0 weight %, about 1.5 weight % to about 4.5 weight %, about 1.5 weight % to about 4.0 weight %, about 1.5 weight % to about 3.5 weight %, about 1.5 weight % to about 3.0 weight %, about 1.5 weight % to about 2.5 weight %, about 1.5 weight % to about 2.0 weight %, about 2.0 weight % to about 6.0 weight %, about 2.0 weight % to about 5.5 weight %, about 2.0 weight % to about 5.0 weight %, about 2.0 weight % to about 4.5 weight %, about 2.0 weight % to about 4.0 weight %, about 2.0 weight % to about 3.5 weight %, about 2.0 weight % to about 3.0 weight %, about 2.0 weight % to about 2.5 weight %, about 2.5 weight % to about 6.0 weight %, about 2.5 weight % to about 5.5 weight %, about 2.5 weight % to about 5.0 weight %, about 2.5 weight % to about 4.5 weight %, about 2.5 weight % to about 4.0 weight %, about 2.5 weight % to about 3.5 weight %, about 2.5 weight % to about 3.0 weight %, about 3.0 weight % to about 6.0 weight %, about 3.0 weight % to about 5.5 weight %, about 3.0 weight % to about 5.0 weight %, about 3.0 weight % to about 4.5 weight %, about 3.0 weight % to about 4.0 weight %, about 3.0 weight % to about 3.5 weight %, about 3.5 weight % to about 6.0 weight %, about 3.5 weight % to about 5.5 weight %, about 3.5 weight % to about 5.0 weight %, about 3.5 weight % to about 4.5 weight %, about 3.5 weight % to about 4.0 weight %, about 4.0 weight % to about 6.0 weight %, about 4.0 weight % to about 5.5 weight %, about 4.0 weight % to about 5.0 weight %, about 4.0 weight % to about 4.5 weight %, about 4.5 weight % to about 6.0 weight %, about 4.5 weight % to about 5.5 weight %, about 4.5 weight % to about 5.0 weight %, about 5.0 weight % to about 6.0 weight %, about 5.0 weight % to about 5.5 weight %, or about 5.5 weight % to about 6.0 weight %. In certain embodiments, the weld metal or core of the metal cored wire comprises molybdenum in about 0.25 weight %, about 0.5 weight %, about 0.75 weight %, about 1.0 weight %, about 1.25 weight %, about 1.5 weight %, about 1.75 weight %, about 2.0 weight %, about 2.25 weight %, about 2.5 weight %, about 2.75 weight %, about 3.0 weight %, about 3.25 weight %, about 3.5 weight %, about 3.75 weight %, about 4.0 weight %, about 4.5 weight %, about 4.25 weight %, about 4.75 weight %, about 5.0 weight %, about 5.25 weight %, about 5.5 weight %, about 5.75 weight %, or about 6.0 weight %.

Tungsten can present in up to 5 weight % of the weld metal or the core of the metal cored wire. In a particular embodiment, tungsten is present in an amount of about 0.1 weight % to about 2.0 weight %. In some embodiment, the weld metal or core of the metal cored wire comprises tungsten in a range of about 0.0 weight % to about 4.5 weight %, about 0.0 weight % to about 4.0 weight %, about 0.0 weight % to about 3.5 weight %, about 0.0 weight % to about 3.0 weight %, about 0.0 weight % to about 2.5 weight %, about 0.0 weight % to about 2.0 weight %, about 0.0 weight % to about 1.5 weight %, about 0.0 weight % to about 1.0 weight %, about 0.5 weight % to about 5.0 weight %, about 0.5 weight % to about 4.5 weight %, about 0.5 weight % to about 4.0 weight %, about 0.5 weight % to about 3.5 weight %, about 0.5 weight % to about 3.0 weight %, about 0.5 weight % to about 2.5 weight %, about 0.5 weight % to about 2.0 weight %, about 0.5 weight % to about 1.5 weight %, about 0.5 weight % to about 1.0 weight %, about 1.0 weight % to about 5.0 weight %, about 1.0 weight % to about 4.5 weight %, about 1.0 weight % to about 4.0 weight %, about 1.0 weight % to about 3.5 weight %, about 1.0 weight % to about 3.0 weight %, about 1.0 weight % to about 2.5 weight %, about 1.0 weight % to about 2.0 weight %, about 1.0 weight % to about 1.5 weight %, about 1.5 weight % to about 5.0 weight %, about 1.5 weight % to about 4.5 weight %, about 1.5 weight % to about 4.0 weight %, about 1.5 weight % to about 3.5 weight %, about 1.5 weight % to about 3.0 weight %, about 1.5 weight % to about 2.5 weight %, about 1.5 weight % to about 2.0 weight %, about 2.0 weight % to about 5.0 weight %, about 2.0 weight % to about 4.5 weight %, about 2.0 weight % to about 4.0 weight %, about 2.0 weight % to about 3.5 weight %, about 2.0 weight % to about 3.0 weight %, about 2.0 weight % to about 2.5 weight %, about 2.5 weight % to about 5.0 weight %, about 2.5 weight % to about 4.5 weight %, about 2.5 weight % to about 4.0 weight %, about 2.5 weight % to about 3.5 weight %, about 2.5 weight % to about 3.0 weight %, about 3.0 weight % to about 5.0 weight %, about 3.0 weight % to about 4.5 weight %, about 3.0 weight % to about 4.0 weight %, about 3.0 weight % to about 3.5 weight %, about 3.5 weight % to about 5.0 weight %, about 3.5 weight % to about 4.5 weight %, about 3.5 weight % to about 4.0 weight %, about 4.0 weight % to about 5.0 weight %, about 4.0 weight % to about 4.5 weight %, about 4.5 weight % to about 6.0 weight %, about 4.5 weight % to about 5.5 weight %, or about 4.5 weight % to about 5.0 weight %. In certain embodiments, the weld metal or core of the metal cored wire comprises tungsten in about 0.25 weight %, about 0.5 weight %, about 0.75 weight %, about 1.0 weight %, about 1.25 weight %, about 1.5 weight %, about 1.75 weight %, about 2.0 weight %, about 2.25 weight %, about 2.5 weight %, about 2.75 weight %, about 3.0 weight %, about 3.25 weight %, about 3.5 weight %, about 3.75 weight %, about 4.0 weight %, about 4.5 weight %, about 4.25 weight %, about 4.75 weight %, or about 5.0 weight %.

Copper is an austenite stabilizer that strengthens weld metal by solid solution hardening. In an embodiment, copper can be present in up to about 4 weight % of the weld metal or the core of the metal cored wire. In a particular embodiment, copper is in a range of about 0.0 weight % to about 2.0 weight %. In some embodiment, the weld metal or core of the metal cored wire comprises copper in a range of about 0.0 weight % to about 4.0 weight %, about 0.0 weight % to about 3.5 weight %, about 0.0 weight % to about 3.0 weight %, about 0.0 weight % to about 2.5 weight %, about 0.0 weight % to about 2.0 weight %, about 0.0 weight % to about 1.5 weight %, about 0.0 weight % to about 1.0 weight %, about 0.5 weight % to about 4.0 weight %, about 0.5 weight % to about 3.5 weight %, about 0.5 weight % to about 3.0 weight %, about 0.5 weight % to about 2.5 weight %, about 0.5 weight % to about 2.0 weight %, about 0.5 weight % to about 1.5 weight %, about 0.5 weight % to about 1.0 weight %, about 1.0 weight % to about 4.0 weight %, about 1.0 weight % to about 3.5 weight %, about 1.0 weight % to about 3.0 weight %, about 1.0 weight % to about 2.5 weight %, about 1.0 weight % to about 2.0 weight %, about 1.0 weight % to about 1.5 weight %, about 1.5 weight % to about 4.0 weight %, about 1.5 weight % to about 3.5 weight %, about 1.5 weight % to about 3.0 weight %, about 1.5 weight % to about 2.5 weight %, about 1.5 weight % to about 2.0 weight %, about 2.0 weight % to about 4.0 weight %, about 2.0 weight % to about 3.5 weight %, about 2.0 weight % to about 3.0 weight %, about 2.0 weight % to about 2.5 weight %, about 2.5 weight % to about 4.0 weight %, about 2.5 weight % to about 3.5 weight %, about 2.5 weight % to about 3.0 weight %, about 3.0 weight % to about 4.0 weight %, about 3.0 weight % to about 3.5 weight %, or about 3.5 weight % to about 4.0 weight %. In certain embodiments, the weld metal or core of the metal cored wire comprises copper in about 0.25 weight %, about 0.5 weight %, about 0.75 weight %, about 1.0 weight %, about 1.25 weight %, about 1.5 weight %, about 1.75 weight %, about 2.0 weight %, about 2.25 weight %, about 2.5 weight %, about 2.75 weight %, about 3.0 weight %, about 3.25 weight %, about 3.5 weight %, about 3.75 weight %, or about 4.0 weight %.

Nitrogen is a strong austenite stabilizer that increases weld metal strength by solid-solution strengthening. Nitrogen in higher quantities, however, can cause weld metal porosity and degraded toughness. Suitable nitrogen addition can reduce carbon content in the weld metal and the propensity to solidification cracking without comprising weld metal strength. Addition of nitrogen can also enhance corrosion resistance. Nitrogen can be present in up to about 0.4 weight % of the weld metal or the core of the metal cored wire. Amounts in excess lead to coarse nitride formation and weld defects (e.g., porosity). In a particular embodiment, the weld metal or core of the metal cored wire comprises nitrogen about 0.01 weight % to about 0.3 weight %. In some embodiment, the weld metal or core of the metal cored wire comprises nitrogen in a range of about 0.0 weight % to about 0.4 weight %, about 0.0 weight % to about 0.3 weight %, about 0.0 weight % to about 0.2 weight %, about 0.1 weight % to about 0.4 weight %, about 0.1 weight % to about 0.3 weight %, about 0.1 weight % to about 0.2 weight %, about 0.2 weight % to about 0.4 weight %, or about 0.2 weight % to about 0.3 weight %. In certain embodiments, the weld metal or core of the metal cored wire comprises nitrogen in about 0.1 weight %, about 0.2 weight %, about 0.3 weight %, or about 0.4 weight %.

Niobium, vanadium, tantalum, and titanium are strong carbide/nitride formers and are effective elements to increase strength of weldment. Tantalum can be added to serve as a solid solution strengthener. Titanium and niobium in small quantities can be added for grain refinement and precipitation hardening purposes to strengthen the weld metal. Niobium, vanadium, tantalum, and titanium can each be independently present in up to about 2 weight % of the weld metal or the core of the metal cored wire. That is, each element can be present in up to about 2 weight %. In particular embodiments, each of niobium, vanadium, tantalum, and titanium can each individually, and independently, be present up to about 1.0 weight %. In some embodiment, the weld metal or core of the metal cored wire comprises niobium, vanadium, tantalum, and/or titanium individually (and independently selected) in a range of about 0.0 weight % to about 2.0 weight %, about 0.0 weight % to about 1.8 weight %, about 0.0 weight % to about 1.6 weight %, about 0.0 weight % to about 1.4 weight %, about 0.0 weight % to about 1.2 weight %, about 0.0 weight % to about 1.0 weight %, about 0.0 weight % to about 0.8 weight %, about 0.0 weight % to about 0.6 weight %, about 0.0 weight % to about 0.4 weight %, about 0.0 weight % to about 0.2 weight %, about 0.2 weight % to about 2.0 weight %, about 0.2 weight % to about 1.8 weight %, about 0.2 weight % to about 1.6 weight %, about 0.2 weight % to about 1.4 weight %, about 0.2 weight % to about 1.2 weight %, about 0.2 weight % to about 1.0 weight %, about 0.2 weight % to about 0.8 weight %, about 0.2 weight % to about 0.6 weight %, about 0.2 weight % to about 0.4 weight %, about 0.4 weight % to about 2.0 weight %, about 0.4 weight % to about 1.8 weight %, about 0.4 weight % to about 1.6 weight %, about 0.4 weight % to about 1.4 weight %, about 0.4 weight % to about 1.2 weight %, about 0.4 weight % to about 1.0 weight %, about 0.4 weight % to about 0.8 weight %, about 0.4 weight % to about 0.6 weight %, about 0.6 weight % to about 2.0 weight %, about 0.6 weight % to about 1.8 weight %, about 0.6 weight % to about 1.6 weight %, about 0.6 weight % to about 1.4 weight %, about 0.6 weight % to about 1.2 weight %, about 0.6 weight % to about 1.0 weight %, about 0.6 weight % to about 0.8 weight %, about 0.8 weight % to about 2.0 weight %, about 0.8 weight % to about 1.8 weight %, about 0.8 weight % to about 1.6 weight %, about 0.8 weight % to about 1.4 weight %, about 0.8 weight % to about 1.2 weight %, about 0.8 weight % to about 1.0 weight %, about 1.0 weight % to about 2.0 weight %, about 1.0 weight % to about 1.8 weight %, about 1.0 weight % to about 1.6 weight %, about 1.0 weight % to about 1.4 weight %, about 1.0 weight % to about 1.2 weight %, about 1.2 weight % to about 2.0 weight %, about 1.2 weight % to about 1.8 weight %, about 1.2 weight % to about 1.6 weight %, about 1.2 weight % to about 1.4 weight %, about 1.4 weight % to about 2.0 weight %, about 1.4 weight % to about 1.8 weight %, about 1.4 weight % to about 1.6 weight %, about 1.6 weight % to about 2.0 weight %, about 1.6 weight % to about 1.8 weight %, or about 1.8 weight % to about 2.0 weight %. In certain embodiments, the weld metal or core of the metal cored wire comprises niobium, vanadium, tantalum, and/or titanium individually (and independently selected) in about 0.1 weight %, about 0.2 weight %, about 0.3 weight %, about 0.4 weight %, about 0.5 weight %, about 0.6 weight %, about 0.7 weight %, about 0.8 weight %, about 0.9 weight %, about 1.0 weight %, about 1.1 weight %, about 1.2 weight %, about 1.3 weight %, about 1.4 weight %, about 1.5 weight %, about 1.6 weight %, about 1.7 weight %, about 1.8 weight %, about 1.9 weight %, or about 2.0 weight %.

Sulfur and phosphorus are impurities and are not intentionally added. These elements are controlled by limiting their amount in the welding consumable. The quantities of sulfur and phosphorus must be controlled in order to avoid weld solidification cracking. As such, in an embodiment, sulfur is below about 0.3 weight % of the weld metal or the core of the metal cored wire. Sulfur can be below about 0.01 weight %. In another embodiment, phosphorous is below about 0.3 weight % of the weld metal or the core of the metal cored wire. Phosphorous can be below about 0.02 weight %. In a particular embodiment, phosphorous is less than about 0.01 weight %.

In some embodiments, the weld metal or core of the metal cored wire comprises boron in a range of about 0.0 weight % to about 1.0 weight %. In a particular embodiment, boron is in a range of about 0.01 weight % to about 0.4 weight %. In some embodiments, boron is present in the weld metal or core of the metal cored wire in a range of about 0.0 weight % to about 1.0 weight %, about 0.0 weight % to about 0.8 weight %, about 0.0 weight % to about 0.6 weight %, about 0.0 weight % to about 0.4 weight %, about 0.0 weight % to about 0.2 weight %, about 0.05 weight % to about 1.0 weight %, about 0.05 weight % to about 0.8 weight %, about 0.05 weight % to about 0.6 weight %, about 0.5 weight % to about 0.4 weight %, about 0.5 weight % to about 0.2 weight %, about 0.1 weight % to about 1.0 weight %, about 0.1 weight % to about 0.8 weight %, about 0.1 weight % to about 0.6 weight %, about 0.1 weight % to about 0.4 weight %, about 0.1 weight % to about 0.2 weight %, about 0.2 weight % to about 1.0 weight %, about 0.2 weight % to about 0.8 weight %, about 0.2 weight % to about 0.6 weight %, about 0.2 weight % to about 0.4 weight %, about 0.4 weight % to about 1.0 weight %, about 0.4 weight % to about 0.8 weight %, about 0.4 weight % to about 0.6 weight %, about 0.6 weight % to about 1.0 weight %, about 0.6 weight % to about 0.8 weight %, or about 0.8 weight % to about 1.0 weight %. In certain embodiments, boron is present in about 0.01 weight %, about 0.05 weight %, about 0.1 weight %, about 0.2 weight %, about 0.3 weight %, about 0.4 weight %, about 0.5 weight %, about 0.6 weight %, about 0.7 weight %, about 0.8 weight %, about 0.9 weight %, or about 1.0 weight %.

In a particular embodiment, the weld metal is predominantly austenite phase with fine dispersed particles minor phases of carbides, nitrides, carbonitrides, and combinations thereof. The carbon and nitrogen contents of the weld metal can be selected to provide a range of yield strength levels ranging from about 60 ksi to about 130 ksi in an as-deposited condition without cold deformation. In a particular embodiment, the yield strength level of the weld metal in an as-deposited condition without cold deformation is in a range of about 60 ksi to about 120 ksi, about 60 ksi to about 110 ksi, about 60 ksi to about 100 ksi, about 60 ksi to about 90 ksi, about 60 ksi to about 80 ksi, about 60 ksi to about 70 ksi, about 70 ksi to about 130 ksi, about 70 ksi to about 120 ksi, about 70 ksi to about 110 ksi, about 70 ksi to about 100 ksi, about 70 ksi to about 90 ksi, about 70 ksi to about 80 ksi, about 80 ksi to about 130 ksi, about 80 ksi to about 120 ksi, about 80 ksi to about 110 ksi, about 80 ksi to about 100 ksi, about 80 ksi to about 90 ksi, about 90 ksi to about 130 ksi, about 90 ksi to about 120 ksi, about 90 ksi to about 110 ksi, about 90 ksi to about 100 ksi, about 100 ksi to about 130 ksi, about 100 ksi to about 120 ksi, about 100 ksi to about 110 ksi, about 110 ksi to about 130 ksi, about 110 ksi to about 120 ksi, or about 120 ksi to about 130 ksi. In certain embodiments, the yield strength level of the weld metal in an as-deposited condition without cold deformation is about 60 ksi, about 65 ksi, about 70 ksi, about 75 ksi, about 80 ski, about 85 ksi, about 90 ksi, about 95 ksi, about 100 ksi, about 105 ksi, about 110 ksi, about 115 ksi, about 120 ksi, about 125 ksi, or about 130 ksi.

Furthermore, increased alloying of strong carbide/nitride formers, such as titanium, tungsten, and tantalum, to form high temperature carbides (e.g., TiC) to enhance strength through precipitation hardening, effectively reduce carbon level in liquid phase during solidification of welds, which leads to reduced hot cracking susceptibility, and retard coarse M2C and M23C6 carbides precipitation at grain boundary. In an embodiment, the weld metal of the disclosure is predominantly austenite. In another embodiment, the weld metal contains low levels (e.g., less than 1 volume %) of inclusion (e.g., FeS and/or MnS). In a certain embodiment, the weld metal contains low levels of impurities (e.g., sulfur and phosphorous, as discussed above).

The microstructural features described above are achieved through the careful combination of weld metal chemistry and welding parameters. In particular, stacking fault energy (SFE) is a function of alloy chemistry, and the value of the SFE corresponds to the types of transformation induced plasticity (TRIP) and twinning induced plasticity (TWIP) mechanisms that occur in high manganese steels during deformation. High manganese steel has rapid work hardening rate because of TWIP and martensite TRIP effects. The activations are triggered by the value of SFE of the alloy and the specific active deformation mechanisms impact the strength and erosion performance of the weld metal. Plastic deformation is mainly realized by martensitic transformation at low SFE value (e.g., less than 12 mJ/m$^2$) and by twinning at intermediate SFE. At high SFE (e.g., greater than 35 mJ/m$^2$), plasticity and strain hardening will be controlled solely by dislocation sliding. Based on this, the SFE value is an important parameter in consumable alloy design because it is viewed as a strong predictor of tensile strength and erosion performance.

Figure 1:
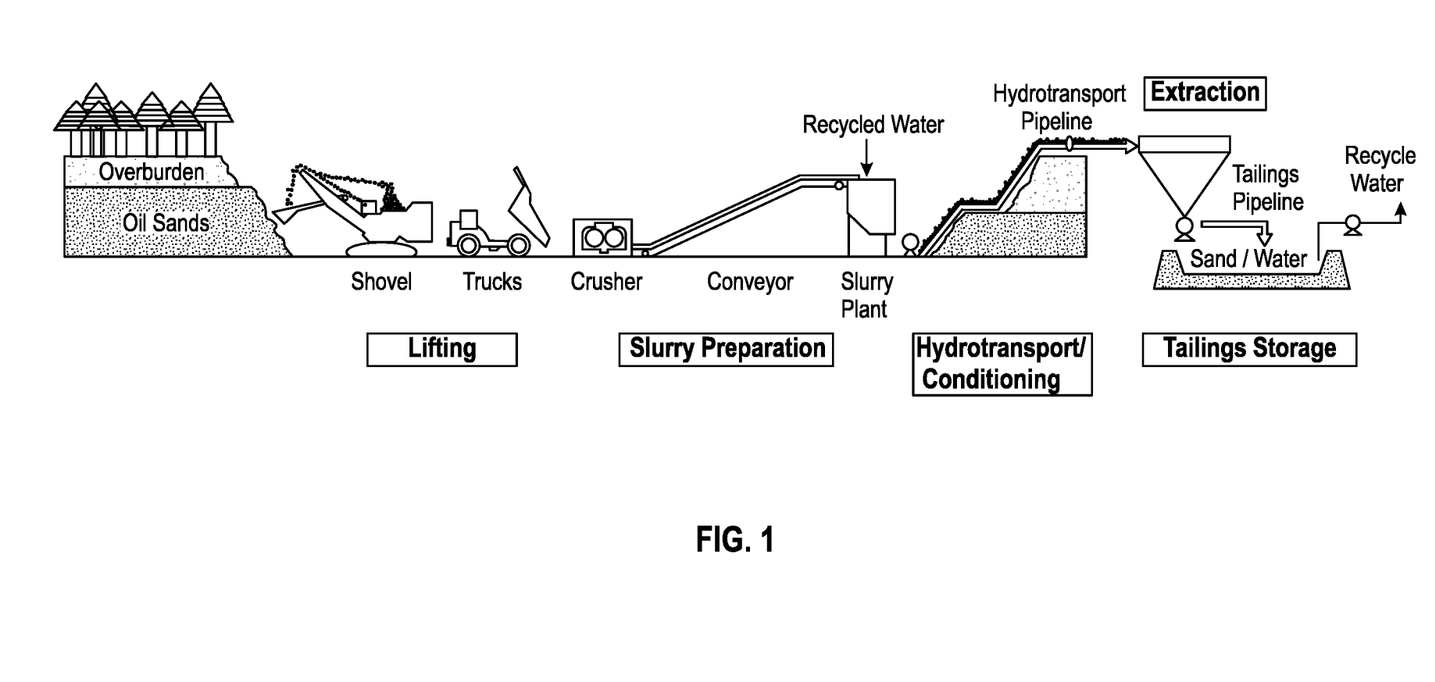
FIG. 1 oil sands surface mining process flow.
Figure 2:
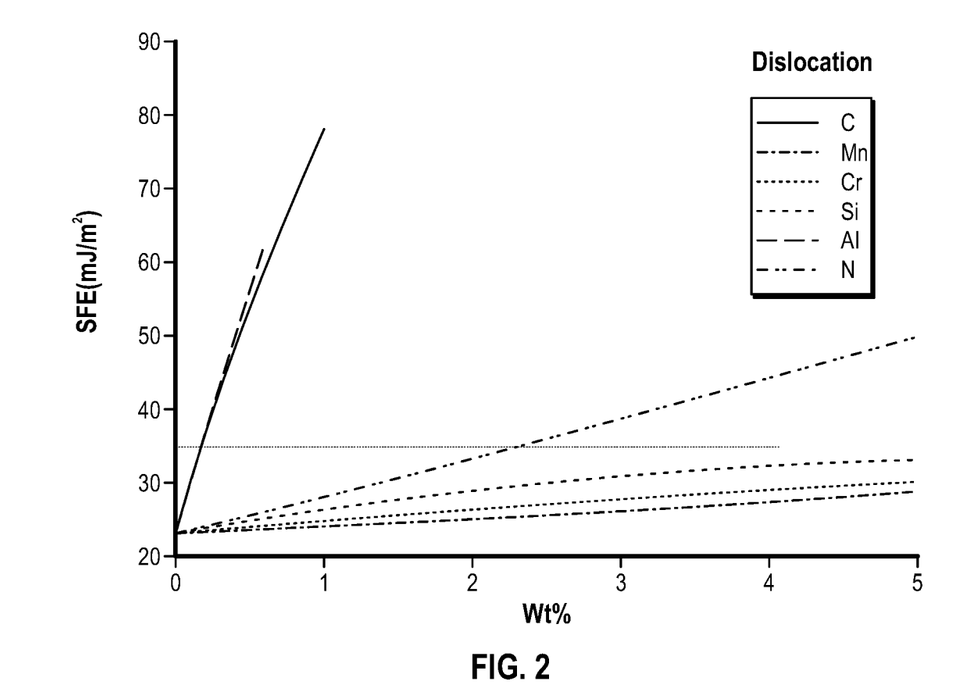
FIG. 2 illustrates the predicted influence of alloy elements on the stacking fault energy.

SFE is a function of alloy chemistry and temperature. The intrinsic stacking fault can be represented as a F-martensite embryo of two places in thickness. The SFE comprises both volume energy and surface energy contributions. The chemistry and temperature dependence of SFE arises largely from the volume energy difference between c-martensite and austenite. The volume free energy of phases can be obtained from available databases. For example, FIG. 2 shows the predicted SFE when adding each element to FeMn12C0.6. The contribution from various alloy addition is different with carbon having the strongest effect and manganese having the smallest effect. However, when multiple alloy element interactions are considered, the dependence of SFE on chemistry is a complex and non-monotonic effect.

The deformation mechanism can be controlled by properly tailoring the weld metal chemistry. For example, the Examples of the present disclosure indicate that lean chemistry (lower alloying content) tends to promote martensite phase transformation and twinning during the deformation.

In an embodiment, the weld metal is strengthened by second phase particles. That is, in an embodiment, the weld metal undergoes precipitation hardening. For example, the weld metal of the disclosure can include carbide, nitride, borides, and/or oxides. The second phase particles of precipitation hardening further improves the wear/erosion resistance of the weld metal. It is believed that second phase particles block the dislocation migration during deformation, thereby increasing the strength of an alloy. Although the presence of carbide in the weld metal increases the hardness, the size and spatial distribution is important. Coarse carbide particles are largely responsible for the mechanical failure of steels. Therefore, the weld metal can include fine, uniformly distributed carbide.

Carbide enhances TRIP and TWIP effects as well. The carbon concentration in carbide phase is much higher than an average value of the steel. By mass conservation, carbide largely depletes the carbon in its surrounding matrix. Therefore, TRIP and TWIP could be the predominant deformation mechanism in the carbon depletion zone.

In another aspect of the present disclosure, the nobleness of the weld metal is similar to the nobleness of the base metal, i.e., the high manganese steel that the weld is applied. This minimizes the preferential weld corrosion through galvanic corrosion. In an embodiment, the nobleness the base metal and the weld metal is the same.

Galvanic corrosion can occur between the different regions of a weld as a result of local differences in composition and microstructure. If the weld metal (WM) and heat affected zone (HAZ) are anodic to the parent metal (PM), then accelerated metal loss can take place in those regions. The severity of this form of corrosion is made worse by the weld metal and heat-affected zone have small surface areas, relative to the large area of the parent pipe material. If the composition of the weld metal is selected to be more noble or less reactive towards atoms or molecules at the interface with a gas or a liquid in corrosive environments than the parent base high Mn steel or close to that of the parent base high Mn steel, it will remain cathodic, reducing its rate of corrosion. In practice, the chemical composition of weld metal can be tailored in order to provide weld metal a more noble potential or comparable potential to the base high Mn steel. The noble alloying content (e.g., Cr) in the weld metal can be maintained at higher level than that of base metal or at a comparable level to that of base high Mn steel for this purpose, as well as for its strength. High Si addition in the weld metal can be detrimental in achieving PWC resistance.

Weldability

An additional aspect of the present disclosure relates to a metal cored wire for use in welding, for example, high manganese steel. The novel ER-HMS weld metal can provide the required weldability to produce erosion resistant HMS slurry pipe through seam welding. This weldability is achieved through proper control of weld metal chemistry, welding process parameters, and welding joint design.

The metal core wire of the present disclosure can be manufactured by working a sheath of steel, e.g., carbon steel or high manganese steel, by bending the width of a steel strip. Metal powders of suitable chemistry, as described above, is filled into the circularly bent strip. The metal powder-filled metal cored wire can be drawn into desired diameter through a series of drawing dies and subsequent annealing to relieve residual stress during the drawing and forming process. Uniform filling of metal powder into the tube can be achieved by using an ultrasonic vibration. The bent strip is then further bent forming a tube that forms the metal core wire.

The tube can be welded along the longitudinal seam. The welded metal cored wire releases less moisture than an unwelded metal cored wire. Unwelded metal cored wire are prone to snaking, thereby making it difficult to adjust the wire feeding to the targeted welding point. In another embodiment, the metal core wire includes a copper coating. The copper coating is more easily applied when the metal cored wire has been welded.

Furthermore, electrolytic or chemical copper coating on the surface of the wire is preferable as it permits uniform electrical conductivity of electrical current from the tip to the wire and thus enhances the arc stability.

The ER-HMS consumables have a similar manganese content as the erosion resistant HMS base metal, which produces a weld metal microstructure similar to the base metal microstructure—austenitic. This chemical compatibility prevents formation of martensitic phases at the weld metal/base metal interface. This eliminates the risk of potential issues such as cold cracking/hydrogen cracking.

Welding Process Parameters

Another aspect of the present disclosure is a method of welding high manganese steel. The application of sound ER-HMS welds produced at practical productivity for slurry pipeline construction can be accomplished with, for example, submerged arc welding.

The method of welding high manganese steel of the present disclosure comprises: supplying at least one piece of high manganese steel; supplying the metal cored wire as described above; submerging the at least one piece of high manganese steel in a slag and arc stabilizer; and applying a current to the metal cored wire to produce a liquid alloy steel composition on the at least one piece of high manganese steel. In some embodiments, the slag comprises: about 22-24% $Al_2O_3$, about 10-12% $SiO_2$, about 6-8% MnO, about 22.5-24.5% $CAF_2$, about 10.5-12.5% MgO, about 11.5-13.5% $CO_2$, about 2.5-4.5% CaO, about 0.5-2.5% $Na_2O$, about 1.0-3.0% $TiO_2$, about 0.5-1.6% $ZrO_2$, about 0.3-1.3% $K_2O$, about 0.2-1.2% Fe, about 0.2-2.2% Mn, and/or about 0.11.0% Si. In other embodiments, the slag comprises at least one of: about 23.1% $Al_2O_3$, about 11.2% $SiO_2$, about 7.1% MnO, about 23.4% $CaF_2$, about 11.6% MgO, about 12.4% $CO_2$, about 3.5% CaO, about 1.3% $Na_2O$, about 2.1% $TiO_2$, about 1.1% $ZrO_2$, about 0.8% $K_2O$, about 0.7% Fe, about 1.2% Mn, about 0.5% Si, or a combination thereof.

The ER-HMS weld metal as described or embraced by the present disclosure may be advantageously utilized in many systems/applications (e.g., oil, gas, and/or petrochemical equipment/systems, such as for reactor vessels, pipes, casings, packers, couplings, sucker rods, seals, wires, cables, bottom hole assemblies, tubing, valves, compressors, pumps, bearings, extruder barrels, molding dies, etc.), particularly where corrosion/cracking resistances are important/desired.

Proper application of the weld metal chemistries, welding processes, and welding practices described above will produce suitable ER-HMS welds with microstructures and mechanical properties required to produce HMS slurry pipe.

The present disclosure will be further described with respect to the following examples; however, the scope of the disclosure is not limited thereby. The following examples illustrate improved systems and methods for fabricating or producing improved high manganese steel welds (e.g., improved high Mn weld compositions having enhanced corrosion and/or cracking resistance).

EXAMPLES

Example 1

Figure 3:
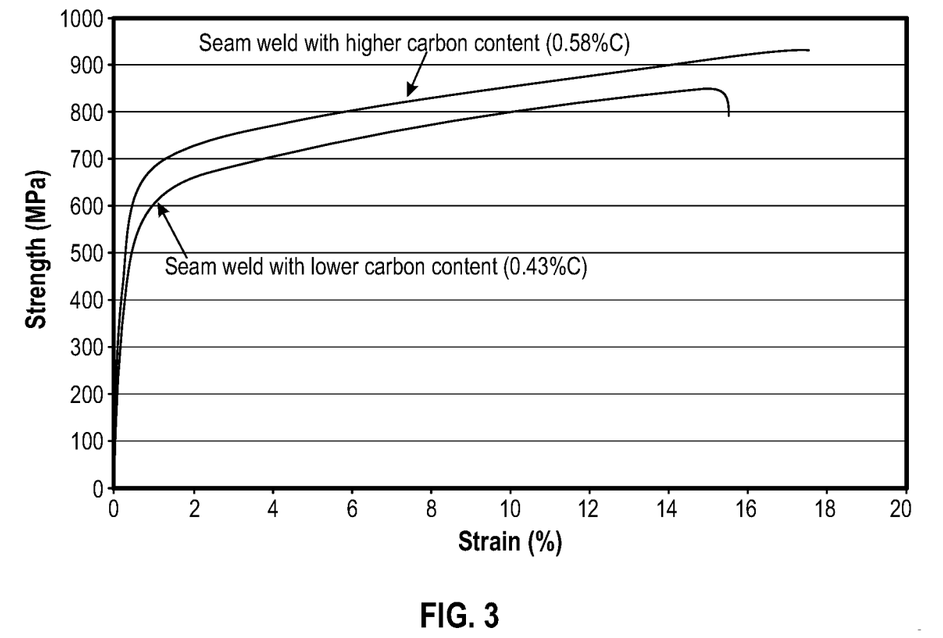
FIG. 3 is a stress-strain curve of two high Mn steel seam welds with different carbon content.

High manganese steel pipes of 24 to 30 inch in diameter with a pipe wall thickness of 19 mm to 20.6 mm were fabricated by submerged arc welding with two different levels of carbon content as shown in FIG. 3. Seam welding was performed under the following welding conditions: a current of 530-630 A and a voltage of 27-31 V, at a welding speed of 510-650 mm/min and heat input of 13-23 kJ/cm. The seam welding with higher carbon content shows increased yield and ultimate tensile strength over the weld metal with lower carbon content.

Example 2

High manganese steel plates of 19 mm thickness were welded with six weld metals of varied weld metal chemistries as shown in Table 1. The abrasion wear resistance of each weld metal was evaluated rotating rubber wheel testing per ASTM G65. Weld metals with higher carbon content and enhanced alloying of Cr, Mo, and W (SL-1 through SL-5) shows improved wear resistance compared with that of lower carbon content weld metal (SL-6) and API X70 carbon steel as shown in FIG. 4.

TABLE 1

Weld metal chemistries

| Weld I.D. | Nominal Weld Metal Chemistry |
|---|---|
| SL-1 | 0.5C—19Mn—2.5Cr—1.2Mo |
| SL-2 | 0.5C—19Mn—2.5Cr—3Mo |
| SL-3 | 0.5C—19Mn—2.5Cr—2.2W |
| SL-4 | 0.45C—19Mn—6Cr—1.5W |
| SL-5 | 0.45C—19Mn—2.5Cr—0.07N |
| SL-6 | 0.43C—17Mn—2.5Cr—0.5Mo |

Example 3

Figure 5:
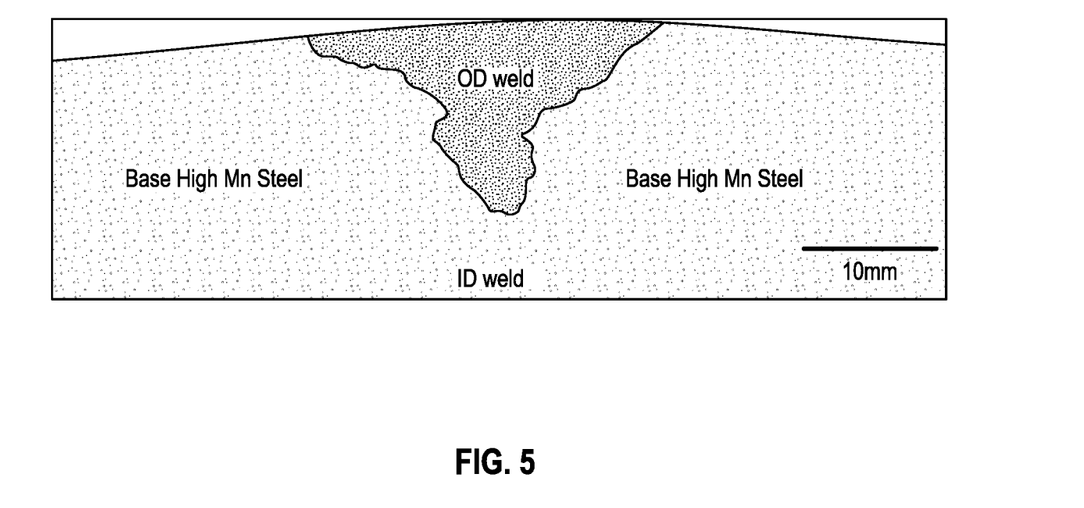
FIG. 5 shows an example of preferential weld corrosion in high Mn steel seam weldment under simulated slurry pipeline environment.

High manganese steel pipes of 24 to 30 inch in diameter with a pipe wall thickness of 19 mm to 20.6 mm were fabricated by submerged arc welding with two different levels of chromium alloying content between ID passes and OD passes as shown in Table 2. The seam weld coupons cut from the seam welded pipe were dipped in an aqueous solution simulating oil sands slurry pipe environment of 45° C. temperature, 1500 ppm NaCl, pH=8, and 8 ppm dissolved oxygen. As shown in FIG. 5, ID pass weld beads with higher Cr content than that of OD pass beads show less corrosion scale and better resistance to preferential weld corrosion.

TABLE 2

Chemistries of weld and base high Mn steel from Inductively-Coupled Plasma Optical Emission Spectroscopy (ICP-OES).

| Weld I.D. | C | Mn | Cr | Si | Ni | Mo | Cu | S | P |
|---|---|---|---|---|---|---|---|---|---|
| ID Passes | 0.96 | 17.9 | 2.92 | 0.34 | 0.04 | 0.27 | 0.46 | 0.002 | 0.013 |
| OD Passes | 0.81 | 18.6 | 2.67 | 0.59 | 0.03 | 0.62 | 0.53 | 0.004 | 0.008 |
| HMS Base Steel | 1.16 | 17.7 | 3.44 | 0.03 | 0.03 | 0.01 | 0.43 | 0.002 | 0.013 |

Whereas the disclosure has been described principally in connection with steel compositions for use in components for the oil, gas and/or petrochemical industry/systems/applications, such descriptions have been utilized only for purposes of disclosure and are not intended as limiting the disclosure. To the contrary, it is to be recognized that the disclosed steel compositions are capable of use in a wide variety of applications, systems, operations and/or industries.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A method of welding high manganese steel, the method comprising:
   supplying at least one piece of high manganese steel;
   supplying a metal cored wire comprising a steel sheath with a core comprising powders of:
   carbon in a range of 0.3 wt. % to 1.2 wt. %;
   silicon in a range of 0.1 wt. % to 3.0 wt. %;
   manganese in a range of 9.0 wt. % to 30 wt. %;
   chromium in an amount less than 8 wt. %;
   nickel in an amount less than 6 wt. %;
   molybdenum in an amount less than 6 wt. %;
   tungsten in an amount less than 5 wt. %;
   copper in an amount less than 4 wt. %;
   niobium in an amount less than 2 wt. %;
   vanadium in an amount less than 2 wt. %;
   titanium in a range of 0.2 wt. % to 2 wt. %;
   nitrogen in an amount less than 0.4 wt. %;
   boron in an amount less than 1 wt. %;
   at least one of: i: sulfur in an amount less than 0.3 wt. %; ii. phosphorous in an amount less than 0.03 wt. %; or a combination thereof; and,
   the balance with iron;
   submerging the at least one piece of high manganese steel in a slag and arc stabilizer; and
   applying a current to the metal cored wire to produce a liquid alloy steel composition on the at least one piece of high manganese steel.

2. The method of claim 1, wherein the slag comprises at least one of 22-24 wt. % $Al_2O_3$; 10-12 wt. % $SiO_2$; 6-8 wt. % MnO; 22.5-24.5 wt. % $CaF_2$; 10.5-12.5 wt. % MgO; 11.5-13.5 wt. % $CO_2$, 2.5-4.5 wt. % CaO; 0.5-2.5 wt. % $Na_2O$; 1.0-3.0 wt. % $TiO_2$; 0.5-1.6 wt. % $ZrO_2$; 0.3-1.3 wt. % $K_2O$; 0.2-1.2 wt. % Fe; 0.2-2.2 wt. % Mn; 0.1-1.0 wt. % Si; or a combination thereof.

3. The method of claim 1, wherein the method comprises:
   providing at least two pieces of high manganese steel, wherein applying the current to the metal cored wire produces the liquid steel composition at the junction between the at least two pieces of high manganese steel.

4. The method of claim 3, further comprising cooling the liquid alloy steel composition to form an alloy steel composition joining the at least two pieces of high manganese steel.

5. The method of claim 1, wherein the slag and arc stabilizer comprise at least one of $TiO_2$, $SiO_2$, $ZrO_2$, $Al_2O_3$, $Na_2O$, $K_2O$, a metal fluoride, or a combination thereof.

6. The method of claim 5, wherein the metal fluoride is selected from the group consisting of: $CaF_2$, $NaF_2$, $MgF_2$, $BaF_2$, and $K_2ZrF_6$.

7. The method of claim 1, wherein the current applied is in a range of 530 to 630 A at a welding speed of 510 to 650 mm/min is achieved.

8. The method of claim 1, wherein the slag comprises at least one of: 23.1 wt. % $Al_2O_3$; 11.2 wt. % $SiO_2$; 7.1 wt. % MnO; 23.4 wt. % $CaF_2$; 11.6 wt. % MgO; 12.4 wt. % $CO_2$; 3.5 wt. % CaO; 1.3 wt. % $Na_2O$; 2.1 wt. % $TiO_2$; 1.1 wt. % $ZrO_2$; 0.8 wt. % $K_2O$; 0.7 wt. % Fe; 1.2 wt. % Mn; 0.5 wt. % Si; or a combination thereof.

* * * * *